UNITED STATES PATENT OFFICE 2,268,062

PREPARATION OF SYNTHETIC RESINS

John Kenson Simons, Dormont, Pa., assignor to Plaskon Company, Inc., Toledo, Ohio, a corporation of Delaware No Drawing. Application December 9, 1938, Serial No. 244,805

3 Claims. (Cl. 260—2)

The invention relates to synthetic resins of the polysulfone type. Polysulfone resins have been made by reacting olefines with sulfur dioxide, but the resins so produced are chemically unstable to an objectionable degree. The instability of these polysulfone resins is believed to arise from the fact that the sulfur atoms in the resin molecule are connected to adjacent carbon atoms.

The principal object of the invention is the preparation of stable polysulfone resins. More specific objects and advantages are apparent from the description, which merely discloses and illustrates the invention and is not intended to impose limitations upon the claims.

The polysulfone resin of the present invention has the general formula $R_x(SO_2)_yr_z$, in which $r$ is an aliphatic radical having two carbon atoms, not directly connected, to which two $SO_2$ groups are attached, and R is an aromatic radical, having two different carbon atoms to which two $SO_2$ groups are attached. It may be prepared by reacting an aliphatic polyhalide, having two carbon atoms, not directly connected, to which two halogen atoms are attached, with a polysulfinate having the general formula $$(R(SO_2-M))_x$$

in which M is a metal, and R is an aromatic radical having two different carbon atoms to which two $SO_2$ groups are attached, not directly connected, to which two $SO_2$ groups are attached. This reaction is preferably carried out by heating the ingredients in the presence of water. It is desirable to select a polyhalide and a polysulfinate such that a soluble metal chloride is formed. The resulting resin may then be purified by simply washing it with water, and dehydrated by heating in an open vessel.

Resins prepared in accordance with the invention are in general transparent, heat-resistant, and insoluble both in water and in all ordinary organic solvents.

Resins embodying the invention may be modified as desired by incorporation of fillers, opacifiers, dyestuffs, pigments, and other coloring matter. The resins that are thermoplastic may be used in their fused condition for various operations, such as impregnation.

Molding powders consisting of the resins in admixture with various modifying agents may be prepared by grinding fillers that have been impregnated with the resins, or simply by grinding the resins together with other ingredients. The resulting powders may then be granulated, or compressed into blanks or preforms of the proper size for use in various molds. The resins may be cast, extruded, molded or formed in any other manner desired. They may also be incorporated with a great variety of other resins or potential resins to produce blended products of any desired properties.

Example 1

4.2 grams of dichloro ethyl ether $$(Cl-CH_2-CH_2-O-CH_2-CH_2-Cl)$$

4.0 grams of potassium benzene-m- disulfinate

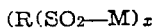

and 5 c. c. of water are refluxed for 16 hours, and distilled to dryness. The residue is washed with water and dried to obtain a yield of 4.0 grams of a transparent thermoplastic resin.

Example 2

34.0 grams of sodium benzene-m-disulfinate, 19.5 grams of dichloro ethyl ether, and 20 c. c. of water are refluxed for 14 hours, and the water and unreacted chloride are then distilled off in an oil bath at 210° C. After the cooled residue has been washed with dilute acid and then with water, it is dehydrated by heating in an open vessel. The resulting resin is similar to that of Example 1.

Various embodiments of the invention may be devised to meet various requirements.

Having described my invention, I claim:

1. A method of preparing synthetic resins that comprises reacting dichloro ethyl ether with a benzene-m-disulfinate of an alkali metal.

2. A method of preparing synthetic resins that comprises heating dichloro ethyl ether in the presence of water with a benzene-m-disulfinate of an alkali metal.

3. A stable polysulfone resin prepared in accordance with the method of claim 1.

JOHN KENSON SIMONS.

CERTIFICATE OF CORRECTION.

Patent No. 2,268,062. December 30, 1941.

JOHN KENSON SIMONS.

It is hereby certified that error appears in the printed specification of the above numbered patent requiring correction as follows: First column, line 27, in the formula, strike out the parenthesis before "R"; lines 31, 32 and 33, strike out ", not directly connected, to which two $SO_2$ groups are attached--; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.